Jan. 12, 1926.

G. H. COLE 1,569,356

ANNEALING FURNACE

Filed August 8, 1922   3 Sheets-Sheet 1

WITNESSES:
C. N. Cochran
H. M. Biebel

INVENTOR
Guerney N. Cole.
BY
Wesley S. Carr
ATTORNEY

Jan. 12, 1926. 1,569,356

G. H. COLE

ANNEALING FURNACE

Filed August 8, 1922   3 Sheets-Sheet 3

WITNESSES:
C. M. Cochran
H M Biebel

INVENTOR
Guerney H. Cole.
BY
Wesley G. Carr
ATTORNEY

Patented Jan. 12, 1926.

1,569,356

UNITED STATES PATENT OFFICE.

GUERNEY H. COLE, OF FOREST HILLS, PENNSYLVANIA, ASSIGNOR TO WESTINGHOUSE ELECTRIC & MANUFACTURING COMPANY, A CORPORATION OF PENNSYLVANIA.

ANNEALING FURNACE.

Application filed August 8, 1922. Serial No. 580,400.

*To all whom it may concern:*

Be it known that I, GUERNEY H. COLE, a citizen of the United States, and a resident of Forest Hills, in the county of Allegheny and State of Pennsylvania, have invented a new and useful Improvement in Annealing Furnaces, of which the following is a specification.

My invention relates to furnaces and, particularly, to pit-type furnaces.

The object of my invention is to provide a furnace structure that shall embody means for varying the rate of cooling of the furnace.

In practicing my invention, I provide a suitable furnace casing comprising heat-insulating walls having an open top and having suitable heating means located therein. I provide a cover for the furnace structure comprising a plurality of separate cover members, the outer ones being relatively thick and heat-insulated, and the inner one being relatively thin.

Figure 1:
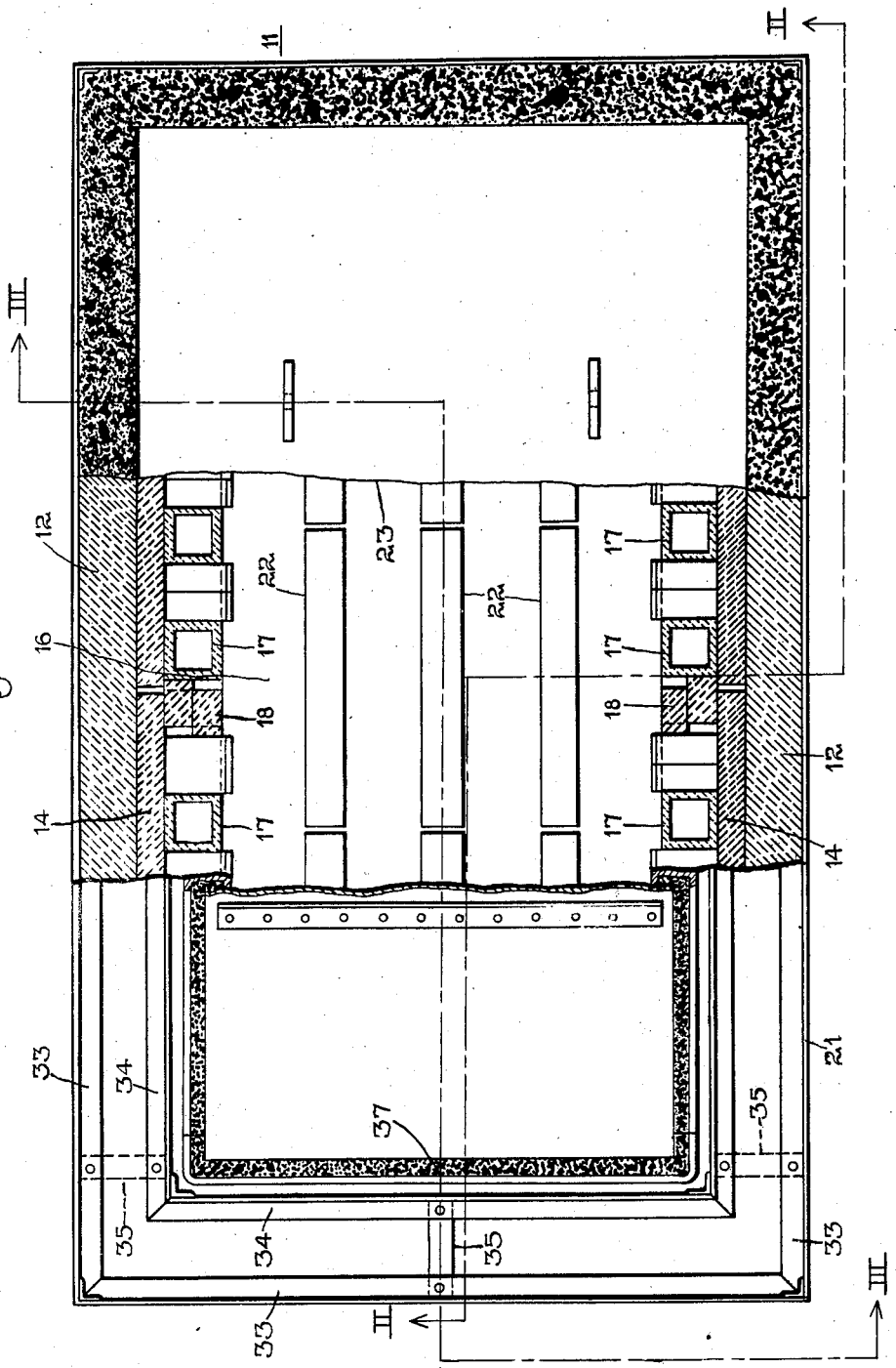
Figure 1 is a plan view, partly in horizontal longitudinal section, of a furnace embodying my invention, taken on the line I—I of Fig. 2.
Figure 2:
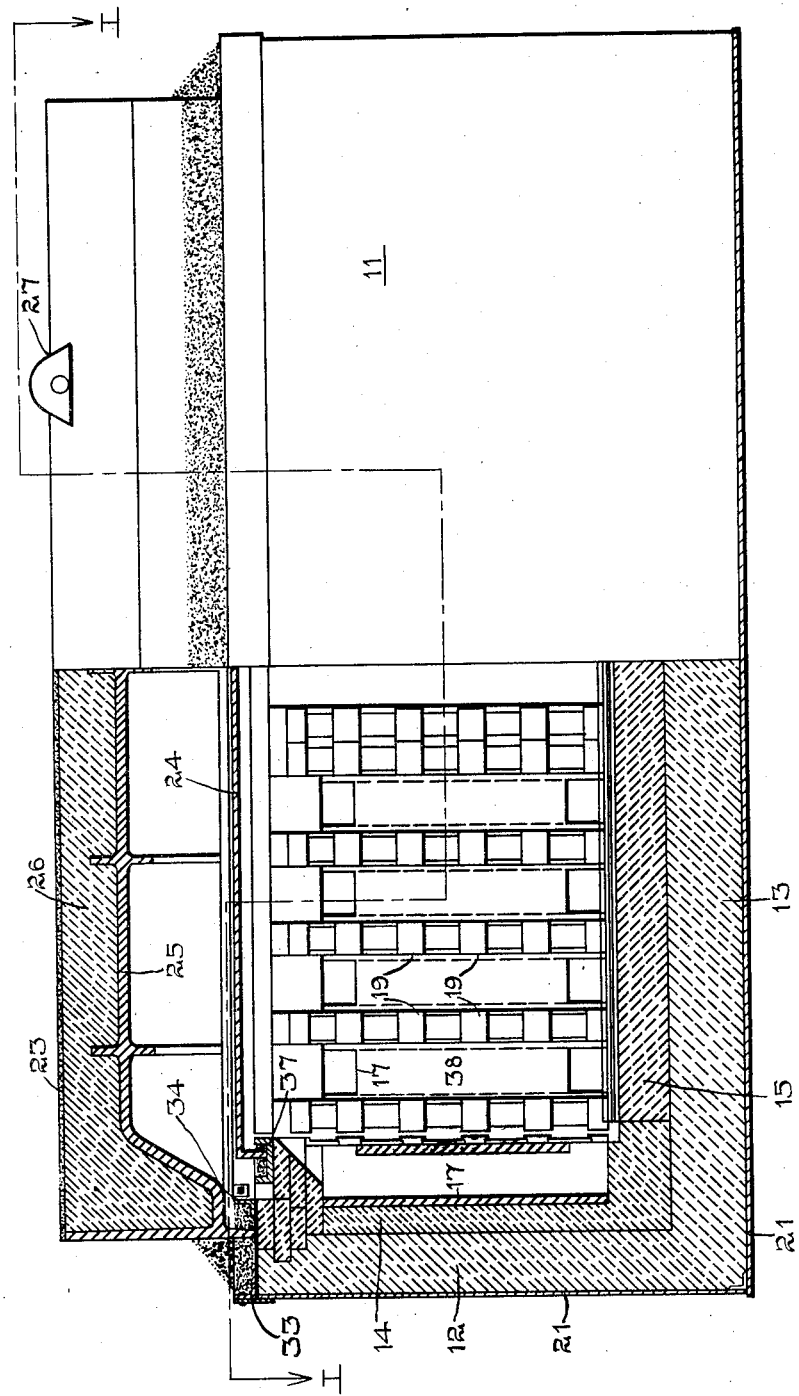
Fig. 2 is a view, partly in side elevation and partly in longitudinal vertical section, on the line II—II of Fig. 1.
Figure 3:
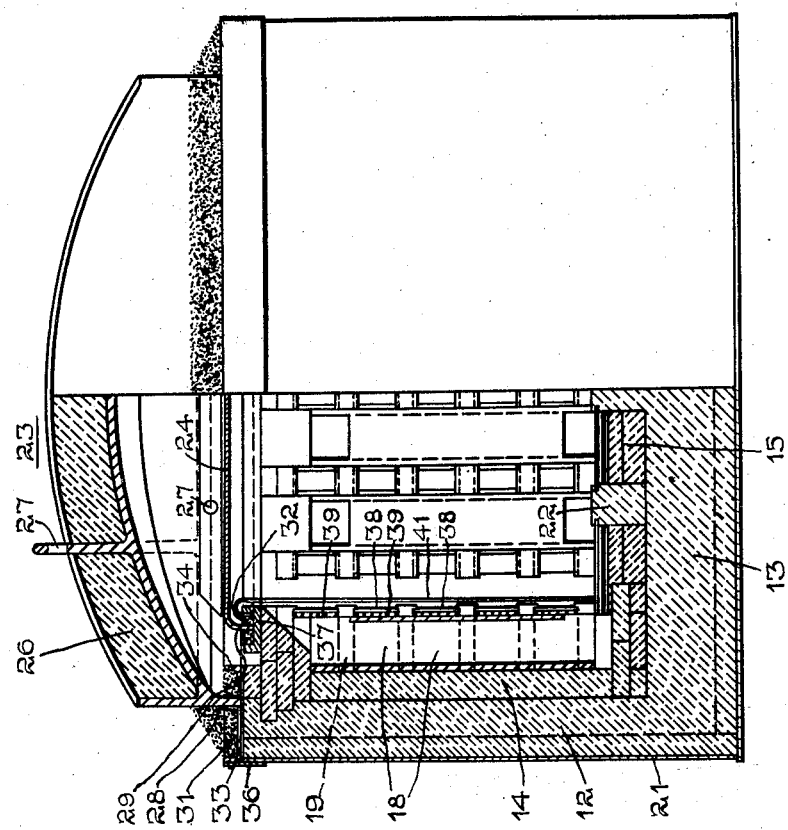
Fig. 3 is a view, partly in end elevation and partly in lateral section, of a furnace embodying my invention.

A furnace structure, designated generally by the numeral 11, comprises a plurality of outer refractory heat-insulating side and end walls 12 and a bottom wall 13. An inner lining for the furnace structure comprises side and end walls 14 of a suitable high temperature-resisting refractory material and a bottom wall 15 of substantially similar material.

A further lining for a furnace chamber 16, constituted by the hereinbefore-described walls, may comprise a plurality of vertically-extending elongated hollow-tile members 17, of substantially rectangular cross-section, which are located in spaced-apart relation around the side and the end walls of the furnace structure. The tile members 17 may have a portion of their inner longitudinal wall at the upper end and at the lower end removed in order to provide an opening through which air from the furnace chamber may circulate in order to assist in obtaining a uniform temperature in the furnace chamber during the operation thereof. While I have illustrated these members, their use is not essential to my invention and they may be omitted. A plurality of refractory bricks or blocks 18 are placed in superposed position between the vertically-extending tile members 17 and are spaced apart, in a vertical direction, by interposed refractory supporting members 19, of substantially T-shape, which are provided to support a resistor-supporting means.

The furnace structure 11 is enclosed within a metal outer casing 21. A plurality of suitable supporting members 22 is embedded in the inner floor lining 15 upon which material to be heat-treated within the furnace may be placed.

A plurality of cover members 23 and 24 is provided for the open top of the furnace structure 11. The outer cover member 23 may comprise a suitable metal casting 25 on one surface of which is placed a relatively thick covering of a suitable heat-insulating material 26. The inner cover member 24 is relatively thin and may comprise a suitable metal casting or a built-up sheet member. Each of the cover members is provided with suitable means, such as lugs or bars 27, having openings therethrough to permit of removing them from the furnace structure and replacing them thereon, as may be required.

Means for co-operating with the outer depending edges 28 and 29 of the outer and the inner cover member, respectively, to provide an air-tight seal for the furnace may comprise built-up channel members within which is placed a quantity 31 and 32 of sand. The outer member, of channel section, which co-operates with the outer cover member 23 may comprise outer angle members 33 and inner angle members 34 which are united, at their respective ends, to constitute substantially rectangular frames located the one within the other and held in spaced-apart relation relatively to each other by suitable metal bars 35. The hereinbefore-described outer channel member, constituted by the plurality of angle bars 33 and 34 and the spacing bars 35, may be suitably located on the top of the furnace walls adjacent the outer edges thereof and be held in place thereon by depending metal bars 36 which, are suitably secured to the vertically-extending flange portion of the angle bar members 33. The inner member of channel section may be constituted by a casting 37, of substantially channel form in cross-section, and be located upon the top of the walls of the furnace structure immediately adjacent the inner edges thereof.

The refractory members 19 hereinbefore described constitute means for supporting refractory resistor-supporting plates 38 which in turn, support electric resistor members 39. The specific construction of the heating elements is described and claimed in a copending application, Serial No. 584,620, filed by T. A. Reid on August 28, 1922, and assigned to the Westinghouse Electric & Manufacturing Company, to which application reference may be had for the details thereof.

A plurality of depending guard members 41, only one of which is shown, supported by the inner channel member 37, is provided to protect the refractory members against injury by material being placed in or removed from the furnace chamber.

It has been found possible, with the type of furnace herein disclosed, to bring the temperature of the furnace chamber and of a charge of sheet steel or other material placed therein to be heat-treated, up to a predetermined maximum temperature within a reasonable amount of time and to maintain the same at the predetermined temperature without the expenditure of an excessive amount of heat energy. However, if no provision is made for permitting a rapid cooling of the furnace and of the charge located therein. it is found that the time required for the furnace and its charge to cool to such a relatively low temperature as will permit of removing the charge therefrom without damage thereto is so long as to make the total time of any one cycle relatively too long for proper commercial operation and efficiency. The plurality of cover members hereinbefore described permits of varying the rate of cooling without permitting the entrance of air from the outside to the furnace chamber. If it is assumed that the furnace has been raised to the proper temperature and maintained thereat for the required length of time, it is possible to remove the outer cover member 23 which, as hereinbefore stated, is provided with a heat-insulating covering and to obtain a much higher rate of cooling through the relatively thin metal inner cover member 24 which, as hereinbefore stated, is provided with air-sealing means, thus ensuring that the charge within the furnace chamber is not subjected to the oxidizing action of entering air.

The device embodying my invention thus provides a relatively simple means for varying the rate of cooling of a pit-type furnace, thereby decreasing the length of time required for a given cycle of operations, thus permitting of obtaining a greater output from a given furnace of this type.

Various modifications may be made in the device embodying my invention without departing from the spirit and scope thereof, and I desire, therefore, that only such limitations shall be placed thereon as are imposed by the prior art or are specifically set forth in the appended claim.

I claim as my invention:—

In an annealing furnace, in combination, a plurality of refractory heat-insulating walls enclosing an open-top furnace chamber, a member of substantially channel section located at the top of said walls adjacent the inner edge thereof an inner cover, of relatively low thermal resistance, for said furnace chamber having its edges engaging said member of channel section, means in said member of channel section for co-operating with said cover member to seal said furnace chamber substantially airtight, a second member of substantially channel section located at the top of said walls adjacent the outer edge thereof, an outer cover member of relatively high thermal resistance and having its edges operatively engaging said second member channel section, and sealing means in said second member of channel section for co-operating with said outer cover member to seal said furnace chamber substantially airtight.

In testimony whereof, I have hereunto subscribed my name this 15th day of July, 1922.

GUERNEY H. COLE.